United States Patent
Desplats et al.

(10) Patent No.: US 10,388,148 B2
(45) Date of Patent: Aug. 20, 2019

(54) METHOD OF CONTROLLING A CALCULATION DEVICE VIA A MOBILE ELEMENT AND CONTROL SYSTEM IMPLEMENTING THIS METHOD

(71) Applicants: CENTRE NATIONAL D'ETUDES SPATIALES, Paris (FR); VEGA FRANCE, Toulouse (FR)

(72) Inventors: Romain Desplats, Castanet Tolosan (FR); Jean-Louis Lopez, Balma (FR)

(73) Assignees: CENTRE NATIONAL D'EDUTES SPATIALES, Paris (FR); VEGA FRANCE, Toulouse (FR)

( * ) Notice: Subject to any disclaimer, the term of this patent is extended or adjusted under 35 U.S.C. 154(b) by 99 days.

(21) Appl. No.: 15/569,420

(22) PCT Filed: Apr. 28, 2016

(86) PCT No.: PCT/EP2016/059557
§ 371 (c)(1),
(2) Date: Oct. 26, 2017

(87) PCT Pub. No.: WO2016/174170
PCT Pub. Date: Nov. 3, 2016

(65) Prior Publication Data
US 2018/0301023 A1    Oct. 18, 2018

(30) Foreign Application Priority Data

Apr. 28, 2015 (FR) .................................. 15 53820

(51) Int. Cl.
| | |
|---|---|
| *G06F 17/00* | (2019.01) |
| *G08C 17/02* | (2006.01) |
| *G06F 3/038* | (2013.01) |
| *G06F 3/0346* | (2013.01) |

(Continued)

(52) U.S. Cl.
CPC ............ *G08C 17/02* (2013.01); *A63F 13/211* (2014.09); *G06F 3/033* (2013.01); *G06F 3/038* (2013.01);

(Continued)

(58) Field of Classification Search
None
See application file for complete search history.

(56) References Cited

U.S. PATENT DOCUMENTS

| | | | |
|---|---|---|---|
| 8,527,908 B2 | 9/2013 | Pance et al. | |
| 2002/0193080 A1* | 12/2002 | Komsi | ................. G06F 3/0233 455/575.1 |

(Continued)

FOREIGN PATENT DOCUMENTS

EP    2 853 992 A1    4/2015

OTHER PUBLICATIONS

International Search Report, dated Jul. 12, 2016, from corresponding PCT/EP2016/059557 application.

(Continued)

*Primary Examiner* — Paul A D'Agostino
(74) *Attorney, Agent, or Firm* — Burris Law, PLLC

(57) ABSTRACT

Disclosed is a method of controlling a calculation device via a mobile element to generate at least one control command associated with its vectorial orientation. The mobile element includes sensors able to provide relative measurements and absolute measurements. The method includes the following steps: provision of an initial vectorial orientation; taking of measurements by the set of sensors; determination of a first elementary vectorial orientation from relative measurements and the prior vectorial orientation; determination of a second elementary vectorial orientation from absolute measurements; determination of the current vectorial orientation (Continued)

from the first and second elementary vectorial orientations; and association of a control command.

15 Claims, 4 Drawing Sheets

(51) Int. Cl.
    *A63F 13/211*      (2014.01)
    *G06F 3/033*      (2013.01)
    *H04W 4/02*      (2018.01)

(52) U.S. Cl.
    CPC .......... *G06F 3/0346* (2013.01); *H04W 4/026* (2013.01); *G08C 2201/32* (2013.01)

(56) References Cited

U.S. PATENT DOCUMENTS

| | | | | |
|---|---|---|---|---|
| 2004/0218104 | A1* | 11/2004 | Smith | G06F 3/017 348/734 |
| 2005/0174324 | A1* | 8/2005 | Liberty | G06F 3/017 345/156 |
| 2005/0243062 | A1* | 11/2005 | Liberty | G06F 3/017 345/158 |
| 2006/0092133 | A1* | 5/2006 | Touma | G06F 3/0346 345/158 |
| 2007/0015558 | A1* | 1/2007 | Zalewski | A63F 13/10 463/1 |
| 2008/0303681 | A1* | 12/2008 | Herz | G06F 1/1616 340/671 |
| 2009/0303204 | A1* | 12/2009 | Nasiri | A63F 13/06 345/184 |
| 2009/0316951 | A1* | 12/2009 | Soderstrom | G06T 7/73 382/103 |
| 2011/0227825 | A1* | 9/2011 | Liberty | G06F 3/0383 345/158 |

OTHER PUBLICATIONS

FR Search Report, dated Feb. 25, 2016, from corresponding FR 15 53820 application.

* cited by examiner

METHOD OF CONTROLLING A CALCULATION DEVICE VIA A MOBILE ELEMENT AND CONTROL SYSTEM IMPLEMENTING THIS METHOD

FIELD OF THE INVENTION

The present invention relates to a method of controlling a calculation device via a mobile element able to be manipulated by a user to generate at least one control command associated with the vectorial orientation of the mobile element.

The mobile element is for example a pointing device or a gamepad able to be manipulated by the user remotely relative to the calculation device. A calculation device refers to any electronic device able to interpret the commands from the user, for example a computer, a video game console, a tablet, a smartphone, etc.

The control commands are advantageously generated based on the vectorial orientation of the mobile element and for example make it possible to move the pointer or any other object on a viewing device connected to the calculation device or integrated therein. The expression "vectorial orientation" refers to a three-dimensional orientation of the mobile element in space as well as its orientation relative to a fixed plane of reference, for example a land-based plane of reference.

BACKGROUND OF THE INVENTION

Different types of methods make it possible to control calculation devices via a mobile element based on its vectorial information, and control systems implementing such methods are known in the state of the art.

Thus, for example, some videogame consoles including a gamepad make it possible to determine the vectorial orientation of this gamepad, i.e., to locate the gamepad in space, by using an absolute plane of reference that is for example fixed relative to the land-based plane of reference.

Such an absolute plane of reference is generally provided by an identification accessory separate from the gamepad and arranged fixedly near the viewing device, for example. This accessory includes a plurality of infrared sensors arranged in separate locations to detect signals emitted by the gamepad from different viewing angles. Thus, to determine the orientation of the gamepad, the control method implemented by the console uses the information from these sensors as well as additional information relating to their orientations relative to one another on the identification accessory.

To improve the location precision of the gamepad and optionally the user's sensations, one or several movement sensors are integrated into the gamepad. Thus, it is known to use an accelerometer integrated into the gamepad to detect accelerations of the gamepad, and an integrated gyroscope to detect angular variations of the gamepad around one or several axes. The control method thus accounts for the measurements provided by the sensors in addition to those provided by the identification accessory.

Consequently, for the known control methods, an identification accessory separate from the gamepad is used to provide an absolute reference. However, with the evolution of portability from calculation devices to portable devices, for example smartphones or smartglasses, the integration of such an identification accessory is becoming increasingly laborious, or even impossible in some cases.

SUMMARY OF THE INVENTION

The present invention aims to propose a control method for a calculation device via a mobile element using only measurements provided by the sensors integrated into the mobile element.

To that end, the present invention relates to a method of controlling a calculation device via a mobile element able to be manipulated by a user for generating at least one control command associated with the vectorial orientation of the mobile element, the method being implemented by a control system including a processing unit able to communicate with the mobile element and the calculation device, the mobile element including a set of sensors able to provide the processing unit with first measurements, called relative measurements, and second measurements, called absolute measurements, characterizing the vectorial orientation of the mobile element.

The relative measurements comprise an angular variation of the mobile element around at least one predetermined axis fixed relative to the mobile element between a previous vectorial orientation and the current vectorial orientation.

The absolute measurements comprise the acceleration of the mobile element at least along the predetermined axis and the intensity of a magnetic field around the mobile element along at least the predetermined axis.

The method includes the following steps:
providing of an initial vectorial orientation;
taking of measurements by the set of sensors upon each movement of the mobile element driven by the user;
determination of a first elementary vectorial orientation of the mobile element on the basis of the relative measurements and of the previous vectorial orientation;
determination of a second elementary vectorial orientation of the mobile element on the basis of the absolute measurements;
determination of the current vectorial orientation of the mobile element from the first elementary vectorial orientation and the second elementary vectorial orientation; and
association of a control command with the current vectorial orientation of the mobile element.

According to other advantageous aspects of the invention, the method comprises one or more of the following features, considered alone or according to all technically possible combinations:
a step for determination of the movement state of the mobile element, the state being a quasi-stationary or non-quasi-stationary state;
the step for determination of the movement state comprises comparing a value corresponding to the speed of change of the orientation of the mobile element with a predetermined threshold;
the current vectorial orientation of the mobile element is further determined on the basis of a stabilization parameter comprised between 0 and 1, and characterizing the stabilization time from the non-quasi-stationary state toward the quasi-stationary state;
when the stabilization parameter is comprised between 0.9 and 1, the current vectorial orientation of the mobile element is equal to the first elementary vectorial orientation; and when the stabilization parameter is comprised between 0 and 0.1, the current vectorial orientation of the mobile element is equal to the second elementary vectorial orientation;

the absolute measurements further comprise the influence of the Earth's gravitational field on at least the predetermined axis of the mobile element and the influence of the Earth's magnetic field on at least the predetermined axis of the mobile element;

a step for determining the absolute position of the mobile element from the acceleration measured along at least the predetermined axis of the mobile element, and a step for initial configuration of the control system making it possible to determine a correspondence between each vectorial orientation of the mobile element and a viewing device.

The invention also relates to a system for controlling a calculation device including a mobile element able to be manipulated by a user to generate at least one control command associated with the vectorial orientation of the mobile element and intended for the calculation devices; a processing unit able to communicate with the mobile element and the calculation device; the mobile element including a set of sensors able to provide the processing unit with relative measurements and absolute measurements characterizing the vectorial orientation of the mobile element.

The relative measurements comprise an angular variation of the mobile element around at least one predetermined axis fixed relative to the mobile element between a previous vectorial orientation and the current vectorial orientation.

The absolute measurements comprise the acceleration of the mobile element at least along the predetermined axis and the intensity of a magnetic field around the mobile element along at least the predetermined axis.

The mobile element is able to take measurements by the set of sensors upon each movement of the mobile element driven by the user, and to send the obtained measurements to the processing unit.

The processing unit is able to:

provide an initial vectorial orientation;

determine a first elementary vectorial orientation on the basis of the relative measurements and of the previous vectorial orientation;

determine a second elementary vectorial orientation on the basis of the absolute measurements;

determine the current vectorial orientation of the mobile element from the first elementary vectorial orientation and the second elementary vectorial orientation; and associate a control command with the current vectorial orientation of the mobile element.

According to other advantageous aspects of the invention, the system comprises one or more of the following features, considered alone or according to all technically possible combinations:

the set of sensors comprises a gyroscope to measure the angular variation of the mobile element around at least the predetermined axis, an accelerometer to measure the acceleration of the mobile element along at least the predetermined axis, and a magnetometer to measure the influence of a magnetic field on the mobile element along at least the predetermined axis, and a magnetic element separate from the mobile element and able to generate a magnetic field near the mobile element.

BRIEF DESCRIPTION OF THE DRAWINGS

The features and advantages of the invention will appear upon reading the following description, provided solely as a non-limiting example, and done in reference to the appended drawings, in which.

DETAILED DESCRIPTION OF THE INVENTION

The expression "substantially equal" refers to a relationship of equality with a precision of 10%.

Figure 1:
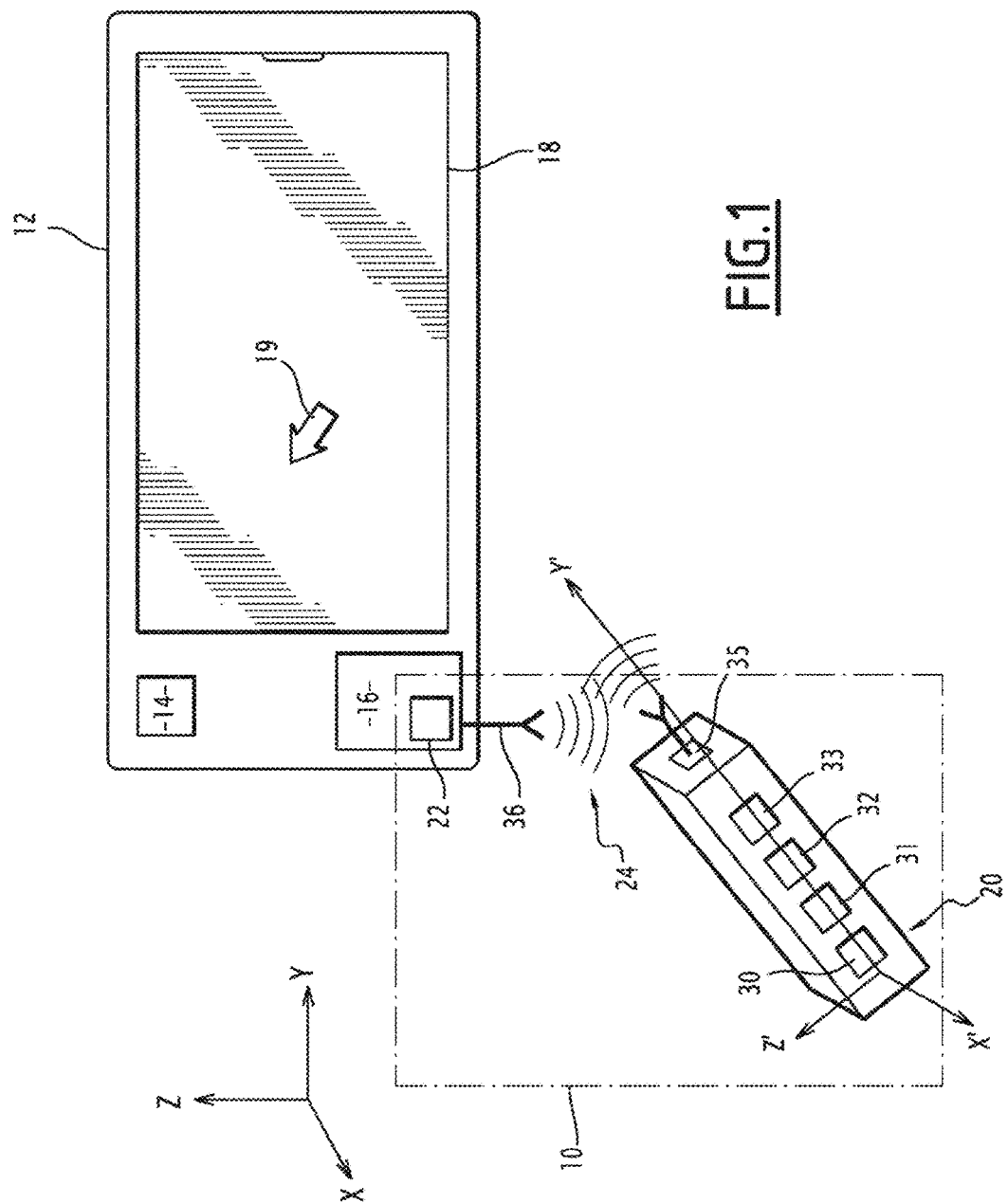
FIG. 1 is a schematic view of a system for controlling a calculation device according to one preferred embodiment of the invention.

The system 10 of FIG. 1 makes it possible to generate control commands of a calculation device 12.

The calculation device 12 is an electronic device able to interpret control commands given by a user.

The calculation device 12 advantageously includes a processor 14 and a storage member 16 able to store a plurality of software programs executable by the processor 14. The storage member 16 comprises an internal memory of the calculation device 12, for example a hard drive, or an external medium, for example an external hard drive or a disc of the CD or DVD type.

In FIG. 1, the calculation device 12 further includes a viewing screen 18 able to display graphic information provided by at least some of the software programs of the storage member 16. This graphic information for example comprises a pointer 19 movable on the viewing screen 18 by the user via control commands.

Thus, the calculation device 12 is for example a computer, a smart TV, a touch-sensitive tablet, a smartphone, a smartwatch or smartglasses.

Alternatively, the calculation device 12 is a video game console or a unit for accessing a computer network, for example supplier Internet access equipment of the "box" type. In this case, the viewing screen 18 is integrated into a viewing device separate from the calculation device 12 and connected to the calculation device 12.

The system 10 includes a mobile element 20 able to be manipulated by the user to generate control commands intended for the calculation device 12, a processing unit 22 able to generate these control commands in particular on the basis of the vectorial orientation of the mobile element 20, and a communication member 24 between the mobile element 20 and the processing unit 22.

The mobile element 20 has an object with a shape suitable for being manipulated by the user. This shape for example ensures good holding of the mobile element 20 in one of the user's hands.

Alternatively, the mobile element 20 is suitable for being fastened on a moving part of the user's body, for example the head or a finger.

According to another alternative, the mobile element 20 is suitable for being fastened on a piece of the users clothing.

In this case, the movements of the mobile element 20 are driven by the corresponding movements of the body part or the piece of clothing.

The mobile element 20 defines a mobile plane of reference RM having three mobile axes X', Y', Z' that are linearly independent and fixed relative to the mobile element 20. In FIG. 1, the mobile axis Y' is a longitudinal axis of the mobile element 20 and the mobile axes X' and Z' are two perpendicular transverse axes.

The plane of reference RM is movable relative to a fixed plane of reference RF having three fixed axes X, Y, Z also visible in FIG. 1. The fixed plane of reference FM is for example a land-based plane of reference.

A current vectorial orientation $P_k$ of the mobile element 20 is defined as the three-dimensional orientation of the mobile plane of reference RM relative to the fixed plane of reference RF. The mobile plane of reference RM is obtained from the fixed plane of reference RF by using a rotation with angle $\theta_k$ relative to a rotation axis defined by a rotation vector $r_{F,k}=[r_{X,k}\ r_{Y,k}\ r_{Z,k}]$.

Thus, the current vectorial orientation $P_k$ of the mobile element 20 is determined at each moment by the rotation angle $\theta_k$ and the rotation vector $r_{F,k}=[r_{X,k}\ r_{Y,k}\ r_{Z,k}]$. For simplicity reasons, this current vectorial orientation $P_k$ of the mobile element is subsequently expressed in the form of a passage quaternion $q_k$ from the mobile plane of reference RM toward the fixed plane of reference RF, the passage quaternion $q_k$ being defined by the following expression:

$$q_k = \left[\cos\frac{\theta_k}{2}, -r_{X,k}\sin\frac{\theta_k}{2}, -r_{Y,k}\sin\frac{\theta_k}{2}, -r_{Z,k}\sin\frac{\theta_k}{2}\right].$$

Thus, it is possible to determine the rotation angle $\theta_k$ and the rotation vector $r_{F,k}$ and, consequently, the current vectorial orientation $P_k$ of the mobile element 20, from the passage quaternion $q_k$.

The mobile element 20 includes a set of sensors able to measure at least some physical parameters relative to the current vectorial orientation $P_k$ of the mobile element 20 or a movement of the element 20 between a prior vectorial orientation $P_{k-1}$ and the current vectorial orientation $P_k$, and the battery 30 powering the set of sensors. The expression "prior vectorial orientation" $P_{k-1}$ refers to the vectorial orientation of the mobile element 20 at a moment earlier than that corresponding to the current vectorial orientation $P_k$.

The set of sensors comprises a gyroscope 31 able to measure an angular variation of the mobile element 20 around each of the mobile axes X', Y', Z' between the current vectorial orientation $P_k$ and the prior vectorial orientation $P_{k-1}$ an accelerometer 32 able to measure the acceleration $\alpha$ of the mobile element 20 along each of the mobile axes X', Y', Z', and a magnetometer 33 able to measure the intensity of the magnetic field B around the mobile element 20 along each of the mobile axes X', Y', Z'.

In particular, the accelerometer 32 is able to measure the influence of the Earth's gravitational field g on each of the mobile axes X', Y', Z', and the magnetometer 33 is able to measure the intensity of the earth's magnetic field $B_T$ around the mobile element 20 along each of the mobile axes X', Y', Z'.

The measurements provided in relation to a movement of the element 20 between the prior vectorial orientation $P_{k-1}$ and the current vectorial orientation $P_k$, for example the measurements from the gyroscope 31, are referred to hereinafter as "relative measurements".

The measurements provided solely in relation to the current vectorial orientation $P_k$ of the mobile element 20, for example the measurements of the accelerometer 32 and the magnetometer 33 respectively regarding the Earth's gravitational field and the Earth's magnetic field, are referred to hereinafter as "absolute measurements".

Additionally, the mobile element 20 includes a plurality of command buttons able to be actuated by the user and making it possible to generate control commands suitable for the calculation device 12.

The processing unit 22 makes it possible to generate control commands intended for the calculation device 12 from measurements provided by the set of sensors, as will be explained below.

The processing unit 22 is a software program stored in the storage member 16 of the calculation device 12 and executed by the processor 14.

Alternatively, the processing unit 22 is an independent processing device implementing one or several processing software programs.

Alternatively, all or part of the storage member 16 of the calculation device 12, the processor 14 and the processing unit 22 are integrated into the mobile element 20.

The communication member 24 includes a transmission module 35 integrated into the mobile element 20 and connected to the set of sensors, and a reception module 36 connected to the processing unit 22.

The transmission module 35 makes it possible to transmit the measurements taken by the set of sensors and optionally the control commands generated by the buttons, to the reception module 36.

The reception module 36 is for example integrated into the calculation device 12 and makes it possible to receive and transmit the data sent by the transmission module 35 to the processing unit 22.

The communication between the transmission module 35 and the reception module 36 is for example a wireless connection based on a digital data transmission protocol known in itself.

Figure 2:
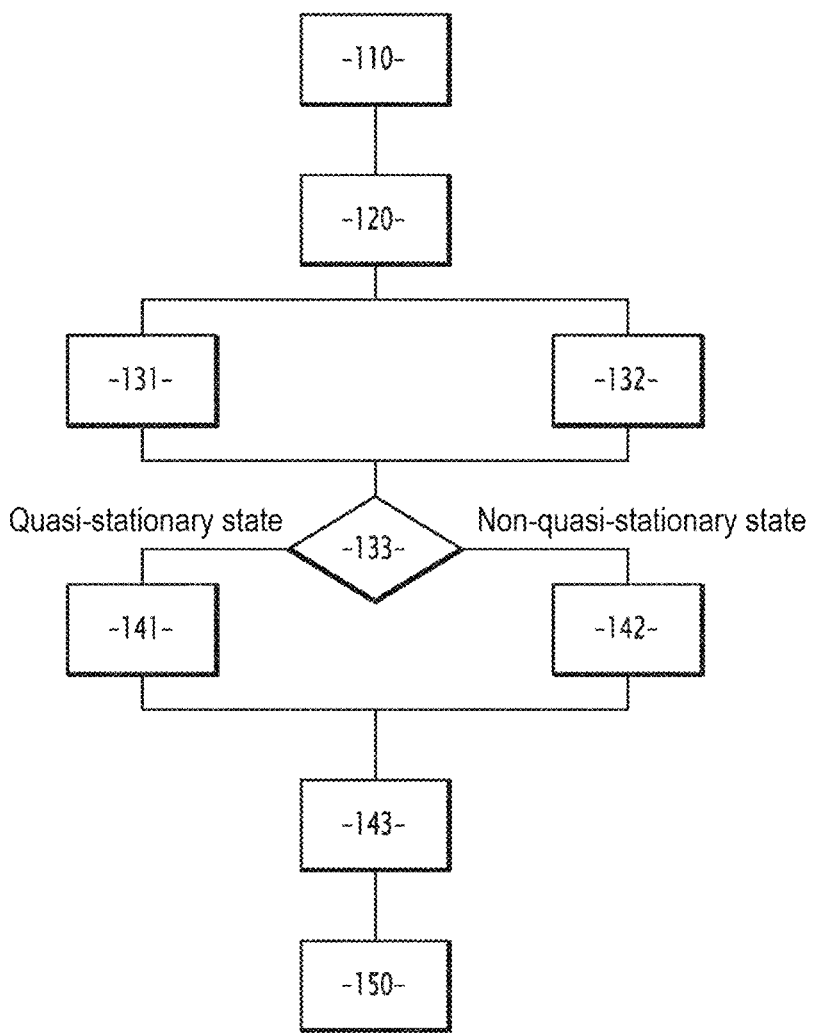
FIG. 2 is a flowchart of a control method carried out by the system of FIG. 1.

The method for controlling the calculation device 12 implemented by the system 10 will now be described in reference to FIG. 2, showing a flowchart of its main steps.

Initially, the mobile element 20 is immobilized and the mobile plane of reference RM is combined with the fixed plane of reference RF. The current vectorial orientation $P_k$ of the mobile element 20 is therefore known. The prior vectorial orientation $P_{k-1}$ of the mobile element 20 is also known and for example equal to the current vectorial orientation $P_k$. To that end, the method generally includes a step for provision of an initial vectorial orientation.

The accelerometer 32 and the magnetometer 33 then take measurements of the acceleration of the Earth's gravitational field and the intensity of the Earth's magnetic field, respectively, on each of the mobile axes X', Y', Z'.

These measurements, hereinafter respectively expressed in the form of the quaternion $G_F=[0\ G_{F,X}\ G_{F,Y}\ G_{F,Z}]$ and the quaternion $B_F=[0\ B_{F,X}\ B_{F,Y}\ B_{F,Z}]$, are transmitted to the processing unit 22 via the communication member 24.

The method then includes a step 110 for setting the mobile element 20 in motion.

During the step 110 for setting in motion, the user drives a movement of the mobile element 20 by modifying the current vectorial orientation $P_k$ for a new current vectorial orientation P*, the set of sensors taking relative measurements characterizing this movement and absolute measurements characterizing the new current vectorial orientation P* of the mobile element 20.

These measurements in particular comprise the angular speed of the mobile element 20 along each of the mobile axes X', Y', Z' measured by the gyroscope 31 for a sampling period $\Delta t$ substantially corresponding to the duration of the movement, the acceleration of the mobile element 20 along each of the mobile axes X', Y', Z' measured by the accelerometer 32 in the new current vectorial orientation P* of the mobile element 20, and the intensity of the magnetic field along each of the mobile axes X', Y', Z' measured by the magnetometer 33 in the new current vectorial orientation P* of the mobile element 20.

The measured angular speed is expressed hereinafter in the form of the quaternion $\omega=[0\ \omega_X\ \omega_Y\ \omega_Z]$, the acceleration in the form of the quaternion $G_M=[0\ G_{M,X}\ G_{M,Y}\ G_{M,Z}]$, and the intensity of the magnetic field in the form of the quaternion $B_M=[0\ B_{M,X}\ B_{M,Y}\ B_{M,Z}]$.

The method then includes a transmission step 120. During the transmission step 120, the set of measurements is transmitted to the processing unit 22 via the communication member 24.

The method then comprises a first determination step 131. More specifically, during the determination step 131, the processing unit 22 determines a first elementary orientation $P^1$ of the mobile element 20 from relative measurements provided by the gyroscope 31, the current vectorial orientation $P_k$ of the mobile element 20, and the prior vectorial orientation $P_{k-1}$ of the mobile element 20.

More particularly, the first elementary orientation $P^1$, expressed in the form of a first elementary quaternion $q^1$, is obtained from the following formula:

$$q^1 = \frac{\Delta t}{2} q_k \otimes \omega + q_{k-1},$$

where
$q_k$ is the passage quaternion corresponding to the current vectorial orientation $P_k$ of the mobile element 20;
$q_{k-1}$ is the passage quaternion corresponding to the prior vectorial orientation $P_{k-1}$ of the mobile element 20; and
$\otimes$ is the multiplication operation of the quaternions defined for any two quaternions $a=[a_1\ a_2\ a_3\ a_4]$ and $b=[b_1\ b_2\ b_3\ b_4]$ as follows:

$$a \otimes b = \begin{bmatrix} a_1 b_1 - a_2 b_2 - a_3 b_3 - a_4 b_4 \\ a_1 b_2 + a_2 b_1 + a_3 b_4 - a_4 b_3 \\ a_1 b_3 - a_2 b_4 + a_3 b_1 + a_4 b_2 \\ a_1 b_4 + a_2 b_3 - a_3 b_2 + a_4 b_1 \end{bmatrix}^T.$$

The method also comprises a second determination step 132. During the second determination step 132, the processing unit 22 determines a second elementary orientation $P^2$ of the mobile element 20 from absolute measurements provided by the accelerometer 32 and the magnetometer 33.

More particularly, the second elementary orientation $P^2$, expressed in the form of a second elementary quaternion $q^2$, is obtained by resolving the following system of equations:

$$\begin{cases} q^2 \otimes G_F \otimes q^{2*} - G_M = 0 \\ q^2 \otimes B_F \otimes q^{2*} - B_M = 0 \end{cases},$$

where the symbol "*" refers to the conjugate operation of the quaternion defined for any quaternion $a=[a_1\ a_2\ a_3\ a_4]$ as follows:

$$a^* = [a_1\ -a_2\ -a_3\ -a_4].$$

This system is for example resolved by using a numerical method.

The determination steps 131 and 132 are advantageously executed in parallel.

The method next includes a step 133 for determining the state of the movement of the mobile element 20.

More specifically, according to the example of FIG. 2, during the step 133 for determining the state, the processing unit 22 determines whether the movement of the mobile element 20 is a quasi-stationary state or a non-quasi-stationary state.

To that end, the processing unit 22 implements a stationarity criterion consisting of comparing an actual acceleration $\dot{q}_k$ of the mobile element 20 during the movement with a predetermined threshold S.

The actual acceleration $\dot{q}_k$ is determined numerically from current $P_k$ and prior $P_{k-1}$ vectorial orientations, for example by using the following expression:

$$\dot{q}_k = \frac{q_k - q_{k-1}}{\Delta t}.$$

Thus, when a norm $\|\dot{q}_k\|$ of the actual acceleration $\dot{q}_k$, for example the norm $\|\ldots\|_2$ consisting of calculating the square root of the sum of the squares of the components of the corresponding quaternion, is below the threshold S, this involves the quasi-stationary state, and the processing unit 22 implements a step 141 for first determination of a parameter. Otherwise, it involves the non-quasi-stationary state, and the processing unit 22 implements a step 142 for second determination of a parameter.

During each of the determination steps 141 and 142, the processing unit 22 determines a stabilization parameter K characterizing the stabilization time from the non-quasi-stationary state toward the quasi-stationary state.

More particularly, during step 141 for first determination of a parameter, case which corresponds to the quasi-stationary state, the processing unit 22 sets the parameter K equal to a predetermined stabilization value that is strictly greater than 0 and less than or equal to 1.

On the contrary, during step 142 for second determination of a parameter, case which corresponds to the non-quasi-stationary state, the processing unit 22 imposes a value equal to 0 for the parameter K.

After the implementation of one of the steps for determining the stabilization parameter K, a step 143 is carried out for determining the new current vectorial orientation P*.

During step 143, the processing unit 22 determines the new current vectorial orientation P* from the first elementary orientation $P^1$, the second current orientation $P^2$ and the stabilization parameter K.

In particular, the quaternion q* corresponding to the new current vectorial orientation P* is determined by using the following expression:

$$q^* = q^1 + K(q^2 - q^1).$$

The processing unit 22 associates the new current vectorial orientation P* with the current vectorial orientation $P_k$, and the current vectorial orientation $P_k$ with the prior vectorial orientation $P_{k-1}$, i.e., the processing unit 22 uses the following equations:

$$q_{k-1} = q_k,\ q_k = q^*.$$

The method next includes a step 150 for generating a control command. More specifically, the processing unit 22 generates a control command associated with the current vectorial orientation $P_k$ of the mobile element 20 and sends this command to the calculation device 12.

Thus, for example, when the mobile element 20 is a pointing device used to move the pointer 19 on the viewing screen 18, the processing unit 20 generates the control command consisting of moving the pointer 19 to the point of the viewing screen 18 corresponding to the current vectorial orientation $P_k$ of the mobile element 20.

The present invention thus has a certain number of advantages.

In particular, the simultaneous use of measurements provided by the accelerometer 32 and the magnetometer 33 makes it possible to determine the vectorial orientation of the mobile element 20 without using an additional identification accessory. This then makes it possible to use the system 10 with various types of calculation devices, including portable devices such as tablets, smartphones and smart-glasses.

Furthermore, the determination of the current vectorial orientation $P_k$ of the mobile element 20 according to the method is particularly reliable, since the distinction between the quasi-stationary state and the non-quasi-stationary state is introduced. Indeed, in the quasi-stationary state, the vectorial orientation of the mobile element 20 determined from relative measurements is more reliable and robust than that determined solely from absolute measurements. Conversely, in the non-quasi-stationary state, the vectorial orientation determined from relative measurements is not very reliable, and the orientation determined from absolute measurements is selected.

Lastly, unlike the existing control systems, the system 10 does not need calibration of the sensors, in particular the gyroscope, providing relative measurements. Indeed, such balancing is done numerically in the non-quasi-stationary state when the absolute measurements are primarily used to determine the current vectorial orientation $P_k$ of the mobile element 20.

According to one additional aspect of the invention, the control method comprises a step for initial configuration of the system 10 relative to the viewing screen 18. This configuration in particular makes it possible to adapt the control commands generated by the processing unit 22 to the dimensions of the viewing screen 18.

Figure 3:
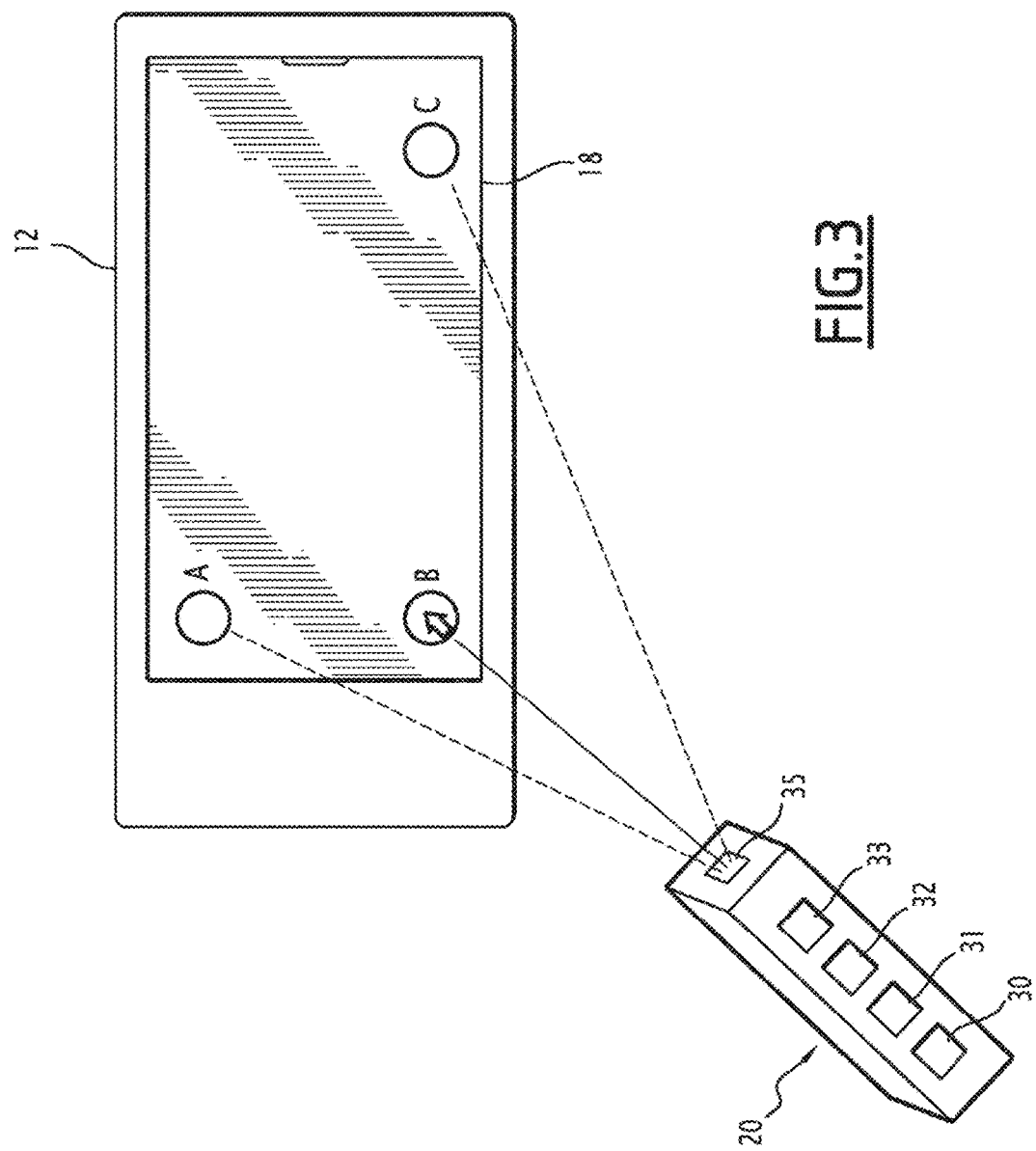
FIG. 3 is a diagram illustrating an initial configuration step of the method of FIG. 2.

Thus, for example, when the mobile element 20 is a pointing device used to move the pointer 19 on the viewing screen 18, the user is invited to point with the mobile element 20 to three separate points A, B, C during the initial configuration step, as illustrated in FIG. 3. Upon each pointing A, B, C, the processing unit determines the current vectorial orientations $P_A$, $P_B$, $P_C$ in the space of the mobile element 20. These current orientations $P_A$, $P_B$, $P_C$ are next used by the processing unit to determine the correspondence between each point of the viewing screen 18 and different vectorial orientations of the mobile element 20 in space.

Alternatively, the viewing screen is replaced by an immersive 3D system. The points A, B, C are then points of the environment. The display of these points can be done through augmented reality.

The initial configuration step is for example launched before each use of the control system 10 or during the use of the control system when the viewing screen 18 for example needs to be changed or its dimensions need to be readjusted.

Alternatively, the initial configuration step is initiated once for each new screen 18 and the correspondence determined during this step is stored in the storage means 16.

Of course, other examples of the initial configuration of the control system 10 relative to the viewing screen 18 or any other object are also possible.

According to still another additional aspect of the invention, the control method comprises a step for calculating the absolute position of the mobile element 20 relative to the fixed plane of reference RF. The absolute orientation in particular comprises a translation and a rotation of the mobile plane of reference RM relative to the fixed plane of reference RF. The translation is calculated from the measurements of the acceleration of the mobile element 20 along each of the mobile axes X', Y', Z' provided by the accelerometer 32.

Figure 4:
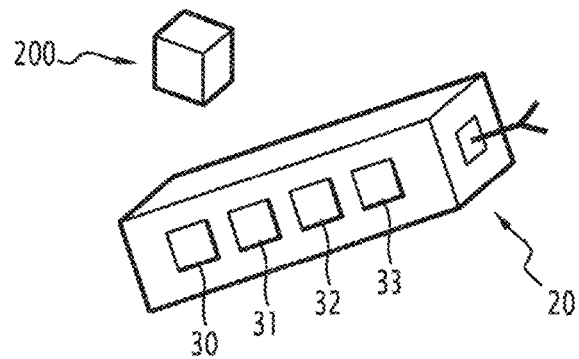
FIGS. 4 and 5 partially illustrate the control system according to other embodiments.

According to the embodiment of the invention illustrated in FIG. 4, the system 10 further includes a magnetic element 200 able to modify the magnetic field around the mobile element 20.

The magnetic element 200 is for example a permanent magnet fastened on a piece of the user's clothing, part of the users body, or any other object near the user.

Thus, when the mobile element 20 is brought closer to the magnetic element 200, the magnetic field around the mobile element 20 is greatly disturbed. This disturbance is measured by the magnetometer 33 and the corresponding measurement is sent to the processing unit 22 in order to generate a corresponding control command.

Alternatively, several magnetometers are integrated into the mobile element 20. This allows better modeling of the magnetic field around the mobile element 20 and optionally determination of the position of the magnetic element 200 relative to the mobile element.

This embodiment is particularly suitable for video games in which the magnetic element 200 has a particular significance.

Figure 5:
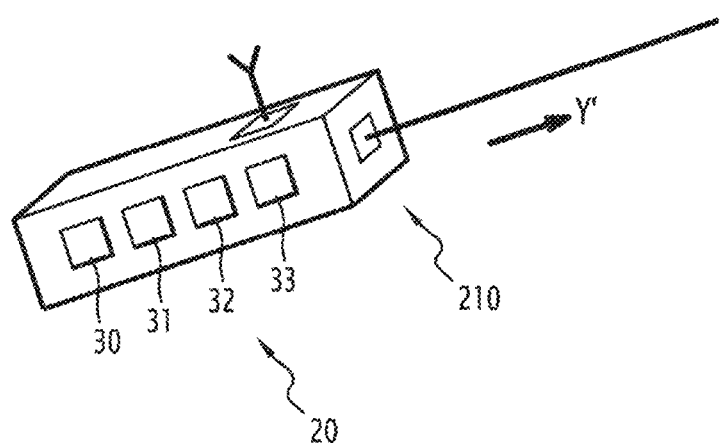

According to the embodiment of the invention illustrated in FIG. 5, the mobile element 20 further includes a lighting device 210 of the laser type. The emission direction of the light flow by the lighting device 210 is for example combined with the longitudinal axis Y' of the mobile element 20.

According to this embodiment, the control method further comprises a step for controlling the intensity of the light flow emitted by the lighting device 210. Thus for example, when the mobile element 20 is used as a pointing device along the longitudinal axis Y', the step for controlling the intensity of the light flow consists of increasing the intensity of the flow gradually when the pointer steered by the mobile element 20 comes closer to a target arranged on the viewing screen 18 or at another predetermined point in space.

According to still another embodiment (not shown), the mobile element 20 further includes an integrated camera.

The field of view of the camera is for example oriented along the longitudinal axis Y' of the mobile element 20.

Thus, the vectorial orientation of the camera is known at each moment by the processing unit 22, which allows it to generate suitable control commands.

According to still another embodiment (not shown), the control system 10 includes several mobile elements 20 as previously described. In this case, the control method is suitable for determining the vectorial orientation of each of these mobile elements 20 to generate suitable control commands. These control commands for example account for the relative orientation of one of the mobile elements 20 with respect to the others.

According to still another embodiment (not shown), the processing unit 22 is integrated into the mobile element 20 in the form of a processing software program.

According to this embodiment, the mobile element 20 further includes a processor able to execute this processing software. The control commands generated by the processing unit 22 are sent directly to the calculation device 12 via suitable communication means.

One skilled in the art will understand that the present invention is not limited to the embodiments described above. Indeed, the determination of the vectorial orientation of a mobile element for suitable computer processing makes it possible to use the invention in many technical fields.

More particularly, the applications of the invention are not limited to games. Like for the Kinect® product by Microsoft® or the solution proposed by the company Apple® in U.S. Pat. No. 8,527,908 B2, the transposition to another application field may be done without difficulty.

In the medical field, for example, the device according to the invention can be used to perform surgical operations. Whether to guide a micro-camera fastened to a catheter or to steer the surgical procedure tool, the invention provides a solution making it possible to gain precision and flexibility. Likewise, to prepare for a simulated procedure or 3D printing of the procedure area, the invention will provide the physician with an improved work, not play, experience. The invention may be combined with haptic stimulators or force feedback stimulators to add a physical sensation to the movement of the device according to the invention.

This work environment can be extrapolated to other fields, for example controlling a robot, technician interventions on complex machines or tools, or remote training or collaborative work.

The invention claimed is:

1. A method of controlling a calculation device via a mobile element able to be manipulated by a user for generating at least one control command associated with the vectorial orientation of the mobile element, the method being implemented by a control system including a processing unit able to communicate with the mobile element and the calculation device, the mobile element including a set of sensors able to provide the processing unit with first measurements, called relative measurements, and second measurements, called absolute measurements, characterizing the vectorial orientation of the mobile element,
   the relative measurements comprise an angular variation of the mobile element around at least one predetermined axis fixed relative to the mobile element between a previous vectorial orientation and a current vectorial orientation,
   the absolute measurements comprise the acceleration of the mobile element at least along the predetermined axis and the intensity of a magnetic field around the mobile element along at least the predetermined axis,
   the method including the following steps:
      providing of an initial vectorial orientation;
      taking of measurements by the set of sensors upon each movement of the mobile element driven by the user;
      determination of a first elementary vectorial orientation of the mobile element on the basis of the relative measurements and of the previous vectorial orientation;
      determination of a second elementary vectorial orientation of the mobile element (20) on the basis of the absolute measurements;
      determination of the current vectorial orientation of the mobile element from the first elementary vectorial orientation and the second elementary vectorial orientation; and
      association of a control command with the current vectorial orientation of the mobile element.

2. The method according to claim 1, further including a step for determination of the movement state of the mobile element, the state being chosen from a group consisting of: a quasi-stationary state and non-quasi-stationary state.

3. The method according to claim 2, wherein the step for determination of the movement state comprises comparing a value corresponding to the speed of change of the orientation of the mobile element with a predetermined threshold.

4. The method according to claim 2, wherein the current vectorial orientation of the mobile element is further determined on the basis of a stabilization parameter comprised between 0 and 1, and characterizing the stabilization time from the non-quasi-stationary state toward the quasi-stationary state.

5. The method according to claim 4, wherein:
   when the stabilization parameter is comprised between 0.9 and 1, the current vectorial orientation of the mobile element is equal to the first elementary vectorial orientation; and
   when the stabilization parameter is comprised between 0 and 0.1, the current vectorial orientation of the mobile element is equal to the second elementary vectorial orientation.

6. The method according to claim 1, wherein the absolute measurements further comprise the influence of the Earth's gravitational field on at least the predetermined axis of the mobile element and the influence of the Earth's magnetic field on at least the predetermined axis of the mobile element.

7. The method according to claim 1, further comprising a step for determining the absolute position of the mobile element from the acceleration measured along at least the predetermined axis of the mobile element.

8. The method according to claim 1, further comprising a step for initial configuration of the control system making it possible to determine a correspondence between each vectorial orientation of the mobile element and a viewing device.

9. A system for controlling a calculation device, including:
   a mobile element able to be manipulated by a user to generate at least one control command associated with the vectorial orientation of the mobile element and intended for the calculation device;
   a processing unit able to communicate with the mobile element and the calculation device;
   the mobile element including a set of sensors able to provide the processing unit with relative measurements and absolute measurements characterizing the vectorial orientation of the mobile element;
   the relative measurements comprising an angular variation of the mobile element around at least one predetermined axis fixed relative to the mobile element between a previous vectorial orientation and a current vectorial orientation;
   the absolute measurements comprising the acceleration of the mobile element at least along the predetermined axis and the intensity of a magnetic field around the mobile element along at least the predetermined axis;
   the mobile element being able to:
   take measurements via the set of sensors upon each movement of the mobile element driven by the user; and
   transmit the obtained measurements to the processing unit;

the processing unit being able to:

provide an initial vectorial orientation;

determine a first elementary vectorial orientation of the mobile element on the basis of the relative measurements and of the previous vectorial orientation;

determine a second elementary vectorial orientation of the mobile element on the basis of the absolute measurements;

determine the current vectorial orientation of the mobile element from the first elementary vectorial orientation and the second elementary vectorial orientation; and associate a control command with the current vectorial orientation of the mobile element.

10. The system according to claim 9, wherein the set of sensors comprises a gyroscope to measure the angular variation of the mobile element around at least the predetermined axis, an accelerometer to measure the acceleration of the mobile element along at least the predetermined axis, and a magnetometer to measure the influence of a magnetic field on the mobile element along at least the predetermined axis.

11. The system according to claim 9, further including a magnetic element separate from the mobile element and able to generate a magnetic field near the mobile element.

12. The system according to claim 9, wherein the set of sensors comprises several magnetometers.

13. The system according to claim 10, wherein the set of sensors comprises several magnetometers.

14. The system according to claim 11, wherein the set of sensors comprises several magnetometers.

15. The system according to claim 10, further including a magnetic element separate from the mobile element and able to generate a magnetic field near the mobile element.

* * * * *